United States Patent Office 2,862,973
Patented Dec. 2, 1958

2,862,973

DI-TERTIARY-ALKYL PEROXIDE PRODUCTION

De Loss E. Winkler, Orinda, George W. Hearne, Lafayette, and William E. Vaughan, Berkeley, Calif., assignors to Shell Development Company, New York, N. Y., a corporation of Delaware No Drawing. Application April 27, 1956
Serial No. 580,992

18 Claims. (Cl. 260—610)

This invention relates to an improved process for the production of di-tertiary-alkyl peroxides and relates more particularly to the production of di-tert-butyl peroxide directly from molecular oxygen and isobutane.

Of the organic peroxidic compounds, the di-tertiary-alkyl peroxides such as, for example, di-tert-butyl peroxide, are outstanding because of the possession of characteristics which render them particularly effective in a varied and wide field of useful application. They are employed as promoters, catalysts and/or initiators in important chemical processes. For example, they function as initiators in the oxidation of organic compounds; they are used as catalysts in the polymerization of many unsaturated compounds. They serve as starting and intermediate materials in the production of valuable chemical derivatives. Di-tert-butyl peroxide is a valuable additive for diesel fuels wherein its presence functions to improve the cetane value.

Methods have been disclosed heretofore directed to the production of di-tertiary-alkyl peroxides such as, for example, di-tert-butyl peroxide. In most of these processes, however, the peroxide is obtained as a component of a relatively complex mixture from which it can be recovered only with difficulty and often at great expense. Certain of these processes rely upon the use of starting materials which are themselves costly to produce in a sufficiently pure state to enable the efficient production of the desired di-tertiary-alkyl peroxide therefrom. It has been disclosed, for example, that di-tert-butyl peroxide can be prepared by the interaction of tertiary-butyl hydroperoxide and tertiary-butyl alcohol. However, the separate initial production of tertiary-butyl alcohol and tertiary-butyl hydroperoxide, in a sufficiently pure state to produce di-tert-butyl peroxide therefrom, is often a complex and costly procedure. Generally, in large scale production by methods disclosed heretofore each of these materials is also obtained as a component of a complex mixture. These often comprise not only by-products and unconverted starting materials but catalyst components, solvents, and the like, employed in their manufacture. The cost of the operative procedures, which must of necessity be resorted to to obtain these materials in a state of sufficient purity to enable the efficient production of di-tert-butyl peroxide therefrom, is often such as to detract materially from the suitability of these compounds as a practical source of the desired peroxidic compound. A process enabling the efficient production of the di-tertiary-alkyl peroxides such as, for example, di-tert-butyl peroxide, in a relatively high state of purity directly from readily available, low-cost starting materials with a minimum of operative steps is, therefore, greatly sought after in the industry.

It is an object of the present invention to provide an improved process enabling the more efficient production of di-tertiary-alkyl peroxides.

Another object of the present invention is to provide an improved process enabling the more efficient production of di-tert-butyl peroxide.

A more specific object of the invention is the provision of an improved process enabling the more efficient production of di-tert-butyl peroxide from readily available materials comprising molecular oxygen and isobutane.

A still further object of the invention is the provision of an improved process enabling the direct conversion of molecular oxygen and isobutane to di-tert-butyl peroxide in a continuous unitary process with a minimum of operative steps. Other objects and advantages of the invention will become apparent from the following detailed description thereof.

In accordance with the invention, a di-tertiary-alkyl peroxide such as, for example, di-tert-butyl peroxide, is produced directly from molecular oxygen and the corresponding paraffinic hydrocarbon containing a tertiary carbon atom in a continuous unitary operation by reacting molecular oxygen with said hydrocarbon in the liquid phase in a reaction medium substantially free of metal ions at a temperature of from about 100° C. to about 200° C., contacting the resulting oxidation products with a mineral acid, and recovering the desired di-tertiary-alkyl peroxide from the resulting reaction products.

The hydrocarbons converted to di-tertiary-alkyl peroxides in accordance with the invention comprise the paraffins having at least four carbon atoms to the molecule and containing at least one tertiary carbon atom. Preferred are the isoparaffins having from four to eight carbon atoms to the molecule, comprising, for example, isobutane, isopentane, isohexane, isoheptane, isooctane, etc. The invention is applied with particular advantage to the production of di-tert-butyl peroxide and di-tert-amyl peroxide from isobutane and isopentane, respectively.

The isoparaffin used as charge to the process of the invention is preferably free of other hydrocarbons. The invention is, however, not limited to the use of only essentially a pure isoparaffin. The presence of normal paraffins in the charge may be tolerated; the isoparaffin generally reacting preferentially in the presence of the normal compound.

The oxygen employed as a reactant in the process may be obtained from any suitable source and may comprise, for example, essentially pure oxygen, or molecular oxygen, in admixture with inert fixed gas as, for example, air, commercial oxygen diluted with nitrogen and/or air, etc.

Reaction of the oxygen with the isoparaffin in the first, or oxidation, stage of the process of the invention is carried out in a reaction medium in which the tertiary-alkyl hydroperoxide corresponding to the isoparaffin charged is substantially stable under the conditions of operation. By a medium in which the charge is stable under the conditions of execution of the invention is meant a reaction medium which is devoid of any substantial amount of metals in the ionic state. In addition, the introduction of any compounds containing reaction groups such as, for example, acids of organic or inorganic character, etc., into the reaction zone is avoided. Essential to the attainment of the substantially metal ion-free reaction medium is the use of a reaction zone wherein the surfaces in contact with the reaction mixture are essentially of materials incapable of introducing any substantial amount of such undesired ions into the first, or oxidation stage of the reaction system under the conditions employed. Thus, the reaction zone may comprise reactors of the chamber and/or tubular type wherein all surfaces in contact with the reaction mixture consist of a relatively inert material such as, for example, glass, ceramic, porcelain or similar non-porous, smooth surfaced, non-catalytic materials. The use of reactors comprising surfaces of stainless steel, tin, titanium, or tantalum in contact with the reaction mixture is, however, comprised within the scope of the invention. The use of these materials under the conditions defined herein generally does not result in the introduction of any substantial amount of metal in ionic form into the reaction mixture. When employing reactors having such a metal surface in contact with the reactants, such surface is preferably treated prior to use to eliminate therefrom metal particles, or ions, capable of being transferred to the reaction mixture during the course of the operation. The treatment may comprise thorough cleaning and/or a suitable passivation treatment, for example, with nitric acid followed by washing with suitable solvents to remove all trace of the acid.

To aid in maintaining the desired metal ion-free condition within the reaction zone, materials charged thereto may be subjected to suitable treatment to avoid introduction of such materials by entrainment.

Essential to the attainment of the objects of the invention is the maintenance of at least a substantial part of the isoparaffin charge in the liquid phase throughout the course of the oxidation step of the process. Pressures employed in the first, or oxidation stage of the invention comprise those at least sufficiently high within the range of from about atmospheric to about 700 p. s. i. g., to maintain the isoparaffin charged in the liquid phase throughout the course of the oxidation. The specific pressure within the permissible range preferably employed will vary in accordance with the specific hydrocarbon charged and specific operating conditions maintained. Thus, when charging isobutane, a minimum pressure of about 400 p. s. i. g., preferably at least 500 p. s. i. g., is employed in the first, or oxidation, stage of the process. When charging hydrocarbons having five and more carbon atoms to the molecule lower pressures, sufficiently high, however, to keep the hydrocarbons in the liquid phase during the oxidation, can be employed.

The isoparaffin oxidation in the first, or oxidation, phase of the process in accordance with the invention is carried out at a temperature in the range of from about 100° C. to about 200° C. Higher temperatures, though not essential to the attainment of the objects of the invention, may be employed within the scope thereof. When the charge to the process is isobutane, the temperature in the first, or oxidation, stage of the process is preferably maintained in the range of from about 100 to about 150° C.

Under the above-defined conditions, the isoparaffin and molecular oxygen interact in the first, or oxidation, phase of the process with the formation of reaction products consisting essentially of the tertiary-alkyl hydroperoxide corresponding to the isoparaffin charged wherein the hydroperoxide group is attached directly to the tertiary carbon atom and the corresponding tertiary alcohol. Thus, isobutane reacts with oxygen to form tertiary-butyl hydroperoxide

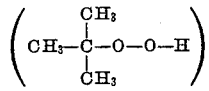

and tertiary-butyl alcohol. When charging isobutane, by-products obtained consist essentially of methanol, formic acid, acetone and $CO_2$.

An advantage of the process of the invention resides in the conversion of the isoparaffin, for example, isobutane, in the first, or oxidation, stage of the process with yields heretofore unattained to intermediate products consisting essentially of the corresponding tertiary-alkyl hydroperoxide and tertiary alcohol in a liquid phase operation. In addition to the advantage of the obtaining of these desired intermediate products in the first, or oxidation, phase of the process with unusually high yields, the process has the advantage of producing these intermediate materials as a mixture which is free of any substantial amount of contaminants in the form of by-products or of materials added to the process as solvents, catalysts or the like.

A particular advantage of the process of the invention resides in the ability to control the oxidation in the first phase of the process to obtain intermediate reaction products comprising a specifically desired ratio of tertiary-alkyl hydroperoxide to tertiary alcohol. Such control is readily obtained by varying operating variables such as conversion and/or contact time. Thus, when charging isobutane the ratio of tertiary-butyl hydroperoxide to tertiary-butyl alcohol, it has been found, decreases with increase in over-all conversion under the above-defined oxidation conditions. Thus, the process enables the isobutane charge to be converted in the first stage of the process to products predominating in tertiary-butyl hydroperoxide; or it can be made to produce a reaction mixture containing the tertiary-butyl hydroperoxide and tertiary-butyl alcohol in proportions particularly suitable for maintaining optimum conditions in the second phase of the process. Thus, in the process the production in the first, or oxidation, stage of a reaction mixture consisting essentially of equal molar parts of tertiary-butyl hydroperoxide and tertiary-butyl alcohol at isobutane conversions above about 30%, up to about 70% and higher, are readily attained.

Within the above-defined permissible range of liquid phase oxidation conditions maintained in the first, or oxidation, stage of the process, the reaction rate to products consisting essentially of tertiary-alkyl hydroperoxide and the corresponding tertiary alcohol increases directly with increase in temperature. When charging isobutane the execution of the first, or oxidation, stage of the process at temperatures below the critical temperature of isobutane is at times desirable because of the high yields of tertiary-butyl hydroperoxide attainable at these lower temperatures. More rapid reaction rates are attainable at higher temperatures, however. Thus, at a temperature of, for example, about 125° C., a reaction rate to the desired intermediate products consisting essentially of tertiary-butyl hydroperoxide and tertiary-butyl alcohol of about 22 grams per hour is attained at a conversion level of about 50%. However, when the oxidation is executed at a temperature of 135° C., the production rate is increased to about 40.5 grams per hour at substantially identical isobutane conversion levels and otherwise substantially identical operating conditions.

It has now been found that isobutane can be oxidized efficiently to the desired intermediate reaction mixture consisting essentially only of tertiary-butyl hydroperoxide and tertiary-butyl alcohol, in the liquid phase, at temperatures above 134° C., without the need of solvents from an external source, in the first, or oxidation, phase of the process by effecting the reaction in the presence of a reaction medium consisting of an admixture of isobutane and isobutane oxidation products consisting predominantly of tertiary-butyl hydroperoxide and tertiary-butyl alcohol. The suitable reaction medium is obtained by first subjecting isobutane to oxidation in the liquid phase as defined herein at a temperature below the critical temperature of isobutane, e. g. 134° C., for example in the range of from about 100 to about 133° C., preferably at about 110 to about 130° C., until a conversion of isobutane of at least 20% and not exceeding about 60%, preferably from about 30 to about 50%, has been attained. The resulting reaction mixture consisting essentially of isobutane, tertiary-butyl hydroperoxide and tertiary-butyl alcohol is thereupon used as the reaction medium for effecting the oxidation of further quantities of isobutane in the liquid phase at temperatures above 135° C. Thus, temperatures in such second step of the first, or oxidation, stage of the process in the range of from about the critical temperature of isobutane to about 150° C. are employed.

Contact of the oxygen, or oxygen-containing gas, with the liquid isoparaffin in the first, or oxidation, stage of the process of the invention is brought about by conventional means and by the use of a reaction zone comprising reactors of conventional design. Thus, in a suitable method of operation oxygen, or an oxygen-containing gas such as air, is introduced into a liquid pool of the isoparaffin in the reaction zone. Normally gaseous material comprising residual oxygen is continuously vented from the reaction zone. Introduction of oxygen into the reaction zone is preferably controlled to result in consumption of at least a substantial part of the oxygen so introduced in the oxidation reaction. In the preferred method of operation a slight excess of oxygen over that which will be consumed under the conditions employed is generally introduced into the reaction zone. Thus, the introduction of the oxygen-containing gas charged into the reaction zone may suitably be controlled to result in an oxygen content of, for example, in the range of from about 1 to about 10% and preferably from about 3 to about 7% in the off-gas leaving the reaction zone when employing air as the oxygen-containing charge.

Materials capable of promoting the reaction of oxygen with isoparaffins including, for example, peroxides such as, tertiary-butyl hydroperoxide and/or di-tert-butyl peroxide may be added to the charge to the system within the scope of the invention. The promoter need be added in only relatively small amounts. Thus, their addition in amounts equivalent to from about 0.1% to about 1.0% of the isobutane charge has been found to be satisfactory. Higher or lower proportions may, however, be employed within the scope of the invention.

Conditions in the first, or isoparaffin oxidation, stage of the process are controlled within the above-prescribed range to obtain an isoparaffin conversion to oxidation products therein of at least 20% and preferably at least 30%.

At least a part or all of the unconverted isoparaffin present in the reaction mixture obtained in the first, or oxidation, phase of the process may be separated therefrom before subjecting the mixture to the second, or acid-contacting, phase of the process. Such separation of unconverted isoparaffin may be carried out by conventional means comprising, for example, flashing, distillation, etc. It is to be pointed out, however, that such separation of isoparaffin components from the reaction mixture obtained in the first, or oxidation, stage of the process before subjecting the mixture to the acid-contacting step of the process is not essential to the attainment of the objects of the invention.

The reaction mixture formed in the first, or oxidation, stage of the process, consisting essentially of tertiary-alkyl hydroperoxide and the corresponding tertiary alcohol, is contacted with a mineral acid or an acid-acting catalyst in the second or di-tertiary-alkyl peroxide-forming stage of the process. Suitable acids comprise, for example, sulfuric acid, phosphoric acid, hydrochloric acid, the sulfonic acids of benzene and its homologues, etc. The use of sulfuric acid of a strength of from about 50 to about 75% is preferred. Acids of greater or lesser strength may, however, be employed within the scope of the invention.

Contact of the reaction mixture produced in the first, or oxidation, phase of the process with the acid, or acid-acting catalyst, is effected at a temperature in the range of from about 0 to about 75° C., and preferably from about 10 to about 50° C. Somewhat higher or lower temperatures may, however, be employed within the scope of the invention. In a preferred modification of the invention a progressively increasing temperature gradient within the defined permissible range is maintained in the second phase of the process. Pressures of about atmospheric or slightly superatmospheric are preferably maintained during the acid contacting step. Higher pressures may, however, be employed within the scope of the invention during the acid-contacting step.

The quantity of acid added to the reaction mixture produced in the first, or oxidation, stage of the process may vary within the scope of the invention. The specific amount preferably employed will vary to some extent with the specific acid used and the specific composition of the product of the first stage of the process. In general the use of the acid in an amount resulting in a mole ratio of acid to tertiary alcohol in the resulting admixture of from about 0.1 to about 3.0 is satisfactory. Higher or lower amounts may, however, be employed within the scope of the invention. When employing sulfuric acid it is preferably added in controlled amounts to obtain a mole ratio of acid to tertiary alcohol of from about 0.1 to about 3.0, and still more preferably from about 0.5 to about 1.0.

Contact of the acid with the reaction mixture emanating from the first, or oxidation, phase of the process is executed in a reaction zone of conventional design. Thus, the reaction zone may comprise a zone of enlarged cross-sectional area, such as a chamber, autoclave, etc., and/or a zone of restricted cross-sectional area such as a tubular reactor or the like. When operating in a batch or semi-continuous operation a single reaction chamber may be employed to effect both the oxidation and acid-contacting phase of the process. In such case the acid is added directly to the reactor contents upon termination of the oxidation after reducing the temperature.

Conventional means are employed to maintain the desired temperature conditions during the acid-contacting step of the process. Agitation of the reaction mixture, for example, by stirring, or other conventional means, is preferably used during the acid-contacting phase of the process.

The addition of additional reactants such as, for example, tertiary alcohol corresponding to that produced in the first stage of the process, to the acid-contacting step of the process may be resorted to within the scope of the invention. Such added tertiary alcohol may be introduced into the second, or acid-contacting phase of the process, as a separate stream or in admixture with a part or all of the acid charged to the system.

Under the above-defined conditions the intermediate reaction mixture of the process produced in the first, or oxidation, stage thereof, is converted to reaction products comprising symmetrical di-tertiary-alkyl peroxide wherein each of the alkyl groups attached through a tertiary carbon atom to the peroxy group (—O—O—) correspond to the isoparaffin charged. Thus, when charging isobutane the product of the process will comprise the desired di-tert-butyl peroxide

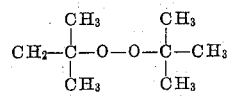

From the second, or acid-contacting, stage of the process the reaction mixture is passed into a suitable product separating zone wherein the di-tertiary-alkyl peroxide is recovered therefrom. Within the recovery zone the reaction products may be subjected to one or more such steps as, for example, decantation, phase separation, solvent extraction, scrubbing, distillation, extractive distillation, flashing, etc.

Thus, in a suitable method of product recovery when charging isobutane the reaction mixture formed in the second, or acid-contacting, stage of the process and comprising, for example, di-tert-butyl peroxide, tert-butyl alcohol, and sulfuric acid, is subjected to phase separation with the formation of an organic phase comprising di-tert-butyl peroxide and an aqueous phase comprising sulfuric acid, tert-butyl alcohol and water. The organic phase is washed with water and recovered as the desired di-tert-butyl peroxide product.

When isobutane is present in the products obtained in the second, or acid-contacting, phase of the process at least a part thereof may be separated therefrom prior to, during, or after the phase separation. The isobutane so separated is recycled to the first, or oxidation, stage of the process.

Excess tertiary-butyl alcohol may be separated from the aqueous phase formed in the phase separation by conventional means such as, for example, distillation, and returned to the second or acid-contacting phase of the process.

*Example I*

Air is passed through 800 grams of isobutane (to which 5 grams of di-tert-butyl peroxide had been added as promoter) in the liquid phase, in a thoroughly cleaned stainless steel reactor maintained at a temperature of 125° C. and at a pressure of about 600 p. s. i. g. Care was taken to exclude the introduction of any substantial amount of metal in ionic form into the reactor. The passage of air through the liquid isobutane was continued until a conversion of isobutane to total oxidation products of 39% had been attained as determined by analysis of samples of the reaction mixture. At this stage the isobutane-free reaction mixture had a tertiary-butyl hydroperoxide equivalent per 100 grams of 1.12 as determined by iodometric method. To 288 grams of the oxidation products thus obtained, consisting essentially of tert-butyl hydroperoxide and tert-butyl alcohol, 246 grams of 70% sulfuric acid were added. Addition of the acid was completed over a 10 minute period during which the mixture was maintained at a temperature of from 13 to 15° C. Upon completion of the acid addition the mixture was maintained at a temperature of from 40 to 45° C. for 30 minutes. Thereupon the reaction mixture was diluted with 300 cc. of water and permitted to stratify. A supernatant layer consisting essentially of di-tert-butyl peroxide and a lower aqueous layer comprising sulfuric acid and a small amount of tert-butyl alcohol formed. The organic layer was washed with 500 cc. of 5% aqueous sodium bicarbonate solution and then with 500 cc. of water. 232 grams of di-tert-butyl peroxide was thus obtained. This represents a yield of di-tert-butyl peroxide of 91.3% based on isobutane converted.

*Example II*

Air is passed through 850 grams of isopentane (to which 5 grams of di-tert-butyl peroxide had been added as promoter) in the liquid phase, in a thoroughly cleaned stainless steel reactor maintained at a temperature of 150° C. and 400 p. s. i. g. Care was taken to exclude the introduction of any substantial amount of metal in ionic form into the reactor. The passage of air through the liquid isopentane was continued for a period of 5 hours. At the end of this period the resulting reaction mixture was freed of material lower boiling than 77° C. 277 grams of distillation bottoms were thus obtained having a hydroperoxide equivalent of 1.06 per 100 grams. To 100 grams of these distillation bottoms, containing 0.53 mole of tert-amyl hydroperoxide and some tert-amyl alcohol, there was added 31 grams (0.35 mole) of tert-amyl alcohol. To the resulting mixture there was added 100 grams of 60% sulfuric acid at a temperature of 14 to 15° C. over a period of 15 minutes. The resulting mixture was stirred for six hours while maintained at a temperature of 20° C. The resulting reaction mixture was diluted with water and permitted to stratify. A supernatant layer consisting essentially of di-tert-amyl peroxide was separated from an acidic aqueous layer. The organic layer so obtained was washed successively with aqueous sodium bircarbonate and water. 73 grams of organic products having an 0.98 equivalent of di-tert-amyl peroxide per 100 grams was obtained.

We claim as our invention:

1. The process for the direct conversion of molecular oxygen and isobutane to reaction products consisting essentially of di-tert-butyl peroxide in a continuous unitary operation which comprises, reacting said molecular oxygen non-catalytically with said isobutane in the liquid phase at tert-butyl hydroperoxide- and tert-butyl alcohol-forming conditions at a temperature above about 100° C. but not substantially above about 150° C., at a pressure above about 400 p. s. i. g. in a substantially metal ion-free initially added reaction medium consisting essentially of isobutane, tert-butyl hydroperoxide and tert-butyl alcohol, thereby reacting molecular oxygen with isobutane with the formation of an oxidation reaction mixture containing tert-butyl alcohol and tert-butyl hydroperoxide, contacting the resulting oxidation reaction mixture with a mineral acid at a temperature of from about 10 to about 75° C., thereby reacting tert-butyl alcohol with tert-butyl hydroperoxide with the formation of a reaction mixture containing di-tert-butyl peroxide, and separating di-tert-butyl peroxide from the resulting reaction mixture.

2. The process in accordance with claim 1 wherein the reaction of said molecular oxygen with said isobutane is executed at a pressure of from about 500 to about 750 p. s. i. g.

3. The process in accordance with claim 1 wherein said oxidation products are contacted with said mineral acid at a temperature of from about 20 to about 50° C.

4. The process in accordance with claim 1 wherein said mineral acid is sulfuric acid.

5. The process in accordance with claim 1 wherein said reaction of said molecular oxygen with said isobutane in the liquid phase is continued for a period sufficiently long to effect the reaction of at least 20% of said isobutane with said oxygen.

6. The process for the direct conversion of molecular oxygen and isobutane to reaction products consisting essentially of di-tert-butyl peroxide in a continuous unitary operation which comprises, reacting said molecular oxygen non-catalytically with said isobutane in the liquid phase at tert-butyl hydroperoxide- and tert-butyl alcohol-forming conditions at a temperature of from 100° C. to about 134° C. in a substantially metal ion-free reaction medium at a pressure of from about 500 to 700 p. s. i. g., thereby reacting molecular oxygen with isobutane with the formation of an oxidation reaction mixture containing tert-butyl alcohol and tert-butyl hydroperoxide adding a mineral acid to the resulting oxidation reaction mixture at a temperature of from about 10 to about 75° C., thereby reacting tert-butyl alcohol with tert-butyl hydroperoxide with the formation of a reaction mixture containing di-tert-butyl peroxide and recovering di-tert-butyl peroxide from the resulting reaction mixture.

7. The process in accordance with claim 6 wherein said mineral acid is sulfuric acid.

8. The process in accordace with claim 6 wherein said reaction of said molecular oxygen with said isobutane in the liquid phase is continued for a period sufficiently long to effect the reaction of at least 20% of said isobutane with said oxygen.

9. The process for the direct conversion of molecular oxygen and isobutane to reaction products consisting essentially of di-tert-butyl peroxide in continuous unitary system which comprises reacting said molecular oxygen non-catalytically with said isobutane in the liquid phase at a temperature in the range of from about 135° C. to about 150° C., at a pressure above about 400 p. s. i. g. in an initially added substantially metal ion-free reaction medium consisting essentially of isobutane, tert-butyl hydroperoxide and tert-butyl alcohol, contacting at least a part of the resulting oxidation reaction mixture with a mineral acid at a temperature from about 10 to about 75° C., and recovering di-tert-butyl peroxide from the resulting reaction mixture.

10. The process in accordance with claim 9 wherein from about 20% to about 60% of said initially added reaction medium consists essentially of tertiary-butyl hydroperoxide and tertiary-butyl alcohol.

11. The process in accordance with claim 9 wherein from about 30% to about 50% of said reaction medium initially added consists essentially of tertiary-butyl hydroperoxide and tertiary-butyl alcohol.

12. The process in accordance with claim 9 wherein said reaction of said molecular oxygen with said isobutane in the liquid phase at a temperature above about 135° C. is executed at a temperature in the range of from about 135° C. to about 150° C., and at a pressure of from about 500 to about 700 p. s. i. g.

13. The process in accordance with claim 12 wherein said mineral acid is sulfuric acid.

14. The process for the direct conversion of molecular oxygen and isobutane to reaction products consisting essentially of di-tert-butyl peroxide in continuous unitary system which comprises reacting said molecular oxygen non-catalytically with said isobutane in the liquid phase in a reaction zone substantially free of metal ions at a temperature of from about 100° C. to about 134° C., at a pressure above about 400 p. s. i. g., continuing said reaction of said molecular oxygen with said isobutane in the liquid phase until at least about 20% of said isobutane has reacted with said molecular oxygen, thereafter continuing the reaction of isobutane with molecular oxygen in said reaction zone in the liquid phase at a temperature in the range of from about 135° C. to about 150° C., at a pressure above about 400 p. s. i. g., contacting at least a part of the resulting oxidation reaction mixture with a mineral acid at a temperature of from about 10 to about 75° C., and recovering di-tert-butyl peroxide from the resulting reaction mixture.

15. The process in accordance with claim 14 wherein said mineral acid is sulfuric acid.

16. The process for the direct conversion of molecular oxygen and an isoparaffin having from four to eight carbon atoms to the molecule to reaction products consisting essentially of symmetrical di-tertiary-alkyl peroxide in a continuous unitary operation which comprises, reacting said molecular oxygen non-catalytically with said isoparaffin in the liquid phase at tertiary alcohol- and tertiary-alkyl hydroperoxide-forming conditions at a temperature above about 100° C. but not substantially above about 200° C. in a substantially metal ion-free initially added reaction medium consisting essentially of isoparaffin hydrocarbon, tertiary-alkyl hydroperoxide and tertiary-alkyl alcohol corresponding to said isoparaffin being reacted, thereby forming a first reaction mixture containing oxidation products consisting essentially of tertiary-alcohol and tertiary-alkyl hydroperoxide corresponding to said isoparaffin, contacting said total first reaction mixture with an acid catalyst at 0 to 75° C., thereby reacting said tertiary alcohol with said tertiary-alkyl hydroperoxide with the formation of a second reaction mixture containing di-tertiary-alkyl peroxide, and separating said di-tertiary-alkyl peroxide from said second reaction mixture.

17. The process for the direct conversion of molecular oxygen and isopentane to di-tertiary-amyl peroxide in a continuous unitary operation which comprises reacting said molecular oxygen non-catalytically with said isopentane in the liquid phase at tertiary-amyl alcohol- and tertiary-amyl-hydroperoxide-forming conditions at a temperature of from about 100° C. to about 175° C. in a substantially metal ion-free reaction medium, thereby reacting said molecular oxygen with said isopentane with the formation of a first reaction mixture containing oxidation products consisting essentially of tertiary-amyl alcohol and tertiary-amyl hydroperoxide, contacting said total first reaction mixture with a mineral acid at 0 to about 75° C., thereby reacting said tertiary-amyl alcohol with said tertiary-amyl hydroperoxide with the formation of a second reaction mixture containing di-tertiary-amyl peroxide, and separating di-tertiary-amyl peroxide from said second reaction mixture.

18. The process in accordance with claim 17 wherein said mineral acid is sulfuric acid.

References Cited in the file of this patent

UNITED STATES PATENTS

| | | |
|---|---|---|
| 2,395,523 | Vaughn et al. | Feb. 26, 1946 |
| 2,403,758 | Rust et al. | July 9, 1946 |
| 2,522,016 | Denison, Jr., et al. | Sept. 12, 1950 |

OTHER REFERENCES

Bell et al.: Ind. and Eng. Chem., vol. 41, pp. 2597–99 (November 1949; entire article pp. 2597–2604).